June 19, 1956
J. JONES
2,751,175
PIPE HANGER CLAMP
Filed Aug. 27, 1952
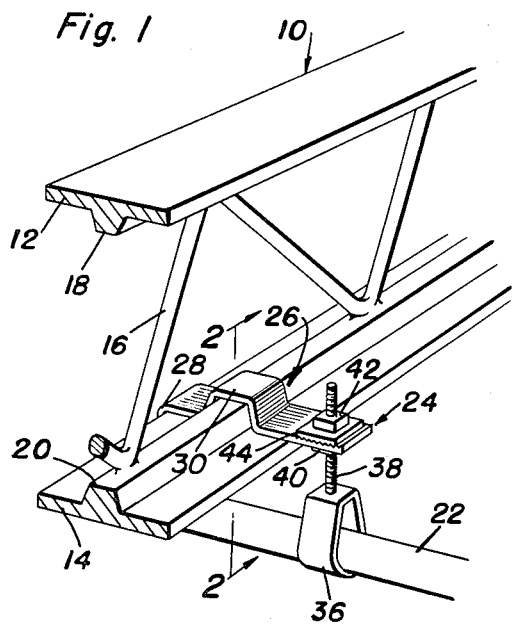
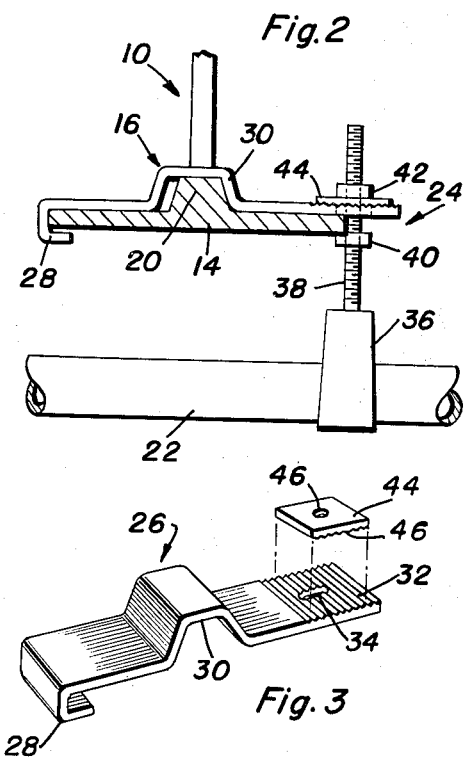
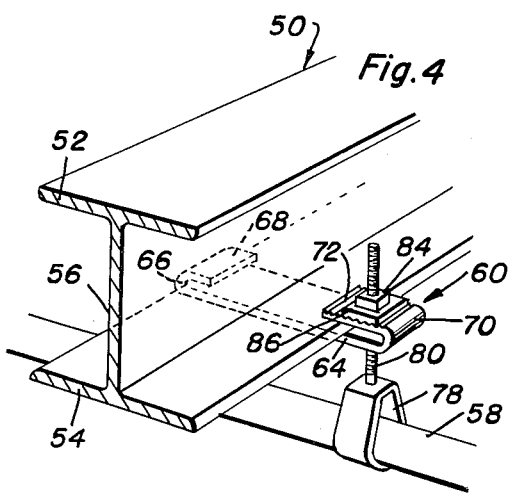
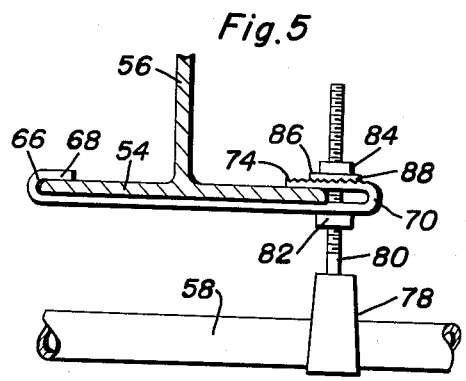
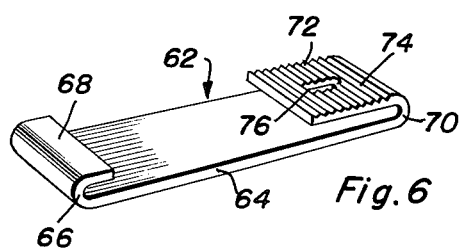
Jahugh Jones
INVENTOR.

United States Patent Office 2,751,175
Patented June 19, 1956

2,751,175

PIPE HANGER CLAMP

Jahugh Jones, Dunbar, W. Va., assignor of fifty per cent to Alfred H. Hoblitzell, Charleston, W. Va.

Application August 27, 1952, Serial No. 306,524

1 Claim. (Cl. 248—72)

This invention relates in general to clamp means, and more specifically to a pipe hanger clamp for mounting on structural means.

The primary object of this invention is to provide an improved pipe hanger clamp which may be rigidly clamped to lower flanges of beams and girders for rigidly supporting pipes therebelow.

Another object of this invention is to provide an improved pipe hanger clamp which may be quickly and easily connected to beams at points intermediate their ends.

Another object of this invention is to provide an improved pipe hanger clamp for attachment to flanges of beams, said clamp being adjustable whereby it may be utilized with beams having flanges of different widths.

A further object of this invention is to provide an improved pipe hanger clamp which is relatively simple in construction and which may be easily formed whereby the same is economically feasible.

A still further object of this invention is to provide an improved pipe hanger clamp in which the means for retaining the same on a flange of a beam is a portion of the hanger for supporting a pipe.

With these objects definitely in view, this invention resides in certain novel features of construction, combination and arrangement of elements and portions as will be hereinafter described in detail in the specification, particularly pointed out in the appended claim, and illustrated in the accompanying drawings which form a material part of this application, and in which:

Figure 1 is a fragmentary perspective view of a light weight truss which has secured to the lower flange thereof a pipe hanger clamp, said pipe hanger clamp having depending therefrom a pipe which is supported thereby;

Figure 2 is an enlarged fragmentary transverse vertical sectional view taken substantially upon the plane indicated by the section line 2—2 of Figure 1 and shows the specific relationship of the clamp to the lower flange of the truss;

Figure 3 is an enlarged exploded perspective view of the clamp portion of the pipe hanger clamp and shows the general construction thereof;

Figure 4 is a fragmentary perspective view of a conventional I-beam having secured to one flange thereof a modified form of pipe hanger clamp which is also utilized for supporting a pipe beneath the beam;

Figure 5 is an enlarged fragmentary transverse vertical sectional view similar to Figure 2 and shows the relationship of the pipe hanger clamp with respect to the lower flange of the beam; and Figure 6 is an enlarged perspective view of a clamp element of the pipe hanger clamp of Figure 4.

Similar characters of reference designate similar or identical elements and portions throughout the specification and throughout the different views of the drawings.

In the construction of modern buildings small trusses and beams are being utilized as floor joists and the like with the result that insufficient nailing surface is provided to which hangers for pipes may be conveniently fastened. Therefore, it has become necessary to provide clamps which may be quickly and effectively secured to the lower flanges of such beams and trusses whereby pipes may be conveniently hung therefrom.

Referring now to Figures 1 through 3, inclusive, it will be seen that there is illustrated a small truss which is referred to in general by the reference numeral 10. The truss 10 includes an upper flange 12 which is in spaced parallel relation to a lower flange 14, the flanges being connected together by a diagonal web 16. It will be noted that the flanges 12 and 14 have opposed longitudinally extending ribs 18 and 20, respectively, to which the web 16 is secured.

Extending transversely of the truss 10 and disposed beneath the lower flange 14 thereof is a conventional pipe 22 which may be a water pipe or other type conduit. Rigidly clamped to the lower flange 14 and supporting the pipe 22 is a pipe hanger clamp which is referred to in general by the reference numeral 24.

The pipe hanger clamp 24 includes a main clamp element which is referred to in general by the reference numeral 26. The clamp element 26 is in the form of a strap having a hook portion 28 at one end and an upwardly offset intermediate portion 30. The upper face of the other end of the clamp element 26 is provided with serrations 32 for a purpose to be explained in more detail hereinafter. The serrated portion of the clamp element 26 is provided with an elongated slot 34 which extends longitudinally thereof.

The pipe hanger clamp 24 also includes a pipe receiving sleeve 36 which is threaded at the lower end of a threaded hanger 38. The threaded hanger 38 is provided with a lower nut 40 and an upper nut 42 which are adjustable thereon. Also carried by the hanger 38 and disposed between the nuts 40 and 42 is a flat plate 44 having a bore 46 therethrough of a diameter equal to the diameter of the hanger 38. The underside of the plate 44 is provided with serrations 46 which are complementary to the serrations 32 of the clamp element 26.

Referring now to Figure 2 in particular, it will be seen that when it is desired to support the pipe 22 below the flange 14 of the truss 10, the clamp element 26 has its hook portion 28 hooked over one edge of the flange 14 and overlies the upper surface of the flange with the offset portion 30 receiving the rib 20 thereof. The sleeve 36 after being positioned over the pipe 22 is aligned with the elongated slot 34 in the clamp element 26 and the hanger 38 is passed therethrough. With the hook portion 28 tightly engaging the said one edge of the flange 14 the hanger 38 is moved toward the hook portion 28 into tight engagement with the other edge of the flange 14. The plate 44 is then moved into engagement with the serrated portion 32 of the clamp element 26 to retain the hanger 38 in its adjusted position and the nuts 40 and 42 are tightened to clamp the lower surface of the flange 14 and the upper surface of the plate 44, respectively. The clamping action of the nuts 40 and 42 rigidly positions the pipe hanger clamp 24 with respect to the flange 14.

Referring now to Figures 4 and 5 in particular, it will be seen that there is illustrated a conventional I-beam which is referred to in general by the reference numeral 50. The I-beam 50 includes an upper flange 52 which is in spaced parallel relation to the lower flange 54 and joined thereto by a vertically extending web 56. Passing beneath the lower flange 54 and suspended therefrom is a pipe 58, the pipe 58 being connected to the flange 54 by a modified form of pipe hanger clamp which is referred to in general by the reference numeral 60.

The pipe hanger clamp 60 includes a clamp element which is generally channel-shaped and is referred to in general by the reference numeral 62. The clamp element 62 includes an elongated web 64 which is provided at one end with an integral hook portion 66, the hook portion 66 terminating in an inwardly directed flange 68 which is relatively short. Integral with the other end of the web 64 is a relatively hook portion 70 which terminates in an elongated inwardly directed flange 72. The ends of the flanges 68 and 72 are in alignment and spaced opposed relation. It will be noted that the upper surface of the flange 72 is provided with serrations 74 and has extending therethrough an elongated slot 76, the axis of the slot 76 extending longitudinally of the clamp element 62.

The pipe hanger clamp 60 also includes a pipe receiving sleeve 78 which depends from the lower end of a threaded hanger 80. Adjustably mounted on the hanger 80 is a lower nut 82 and an upper nut 84 which have disposed therebetween a flat plate 86. The plate 86 is identical to the plate 44 and has a centrally located bore therethrough and its underside is provided with serrations 88 which are complementary to the serrations 74 of the clamp element 62.

Referring now to Figure 5 in particular, it will be seen that the spacing between the ends of the flanges 68 and 72 is less than the width of the flange 54 whereby the clamp element 62 may be positioned thereon with one edge of the flange 54 tightly engaged by the hook portion 66. It will be also noted that the distance between the end of the flange 68 and the base of the hook portion 70 is greater than the width of the flange 54 whereby the clamp element 62 may be positioned upon the flange 54 by sliding the hook portion 70 over the other edge of the flange and then tilting the hook portion 66 up into alignment with the said one edge of the flange and shifting the clamp element 62 to the position illustrated in Figure 5.

After the clamp element 62 has been so positioned on the flange 54, the hanger 80 is passed through an elongated slot in the web 64 of the clamp element and through the elongated slot 76 with the sleeve 78 receiving the pipe 58. The sleeve 78 and the hanger 80 are then moved toward the flange 54 with the hanger 80 tightly engaging said other edge of the flange. When so positioned, the plate 86 carried by the hanger 80 is moved into engagement with the serrated upper surface of the flange 72 and the hanger 80 is retained in its adjusted position thereby. The nuts 82 and 84 are then tightened down to tightly clamp the lower surface of the web 64 and the upper surface of the plate 86, respectively. When the nuts 82 and 84 are in their clamping positions, the pipe hanger clamp 60 is rigidly clamped to the flange 52 of the I-beam 50.

It will be understood that the pipe hanger clamps 24 and 60 may be removed from engagement with their respective flanges by loosening the nuts of their hangers and reversing the assembly procedure. Inasmuch as none of the elements of the pipe hanger clamps are damaged in either the assembly or disassembly operation, it will be seen that the pipe hanger clamp which is the subject of this invention may be reused a number of times.

The operation of this device will be understood from the foregoing description of the details thereof, taken in connection with the above recited objects and drawings. Further description would appear to be unnecessary.

Minor modifications of the device, varying in minor details from the embodiment of the device illustrated here, may be resorted to without departure from the spirit and scope of this invention, as defined in the appended claim.

Having described the invention, what is claimed as new is:

In combination with a beam having a wide flange having opposite faces and free edges, a beam clamp assembly comprising a generally C-shaped strap having opposed hook portions connected by a web, said web engaging one of said faces, said hook portions extending around said free edges and engaging the other of said faces, said hook portions having opposed ends spaced apart a distance greater than the width of said flange, the distance between bases of said hook portions being greater than the width of said flange and one of said hook portions being larger than the other to facilitate engagement of said strap over said flange, aligned slots in said one hook portion extending longitudinally of said strap, a hanger passing through said slots, adjustably engaging one of said free edges and forcing the other of said free edges into said other hook portion, and a clamp plate carried by said one hook portion being in overlying interlocking relation with said one hook portion and retaining said hanger in position relative to said strap.

References Cited in the file of this patent

UNITED STATES PATENTS

| | | |
|---|---|---|
| 497,679 | Newbury | May 16, 1893 |
| 1,046,903 | Travalled | Dec. 10, 1912 |
| 1,336,667 | Weston | Apr. 13, 1920 |
| 1,343,930 | Neely | June 22, 1920 |
| 1,539,437 | Shirley | May 26, 1925 |
| 1,976,595 | Asleson | Oct. 9, 1934 |
| 2,470,991 | Kindorf | May 24, 1949 |